ns
Patented Jan. 19, 1971

3,557,084
SULFITE-CARBONYL STARCH COMPLEX AND METHOD OF PREPARATION
Roy G. Hyldon, Crystal Lake, Ill., Robert L. High, Canal Winchester, Ohio, and Fredrick H. Anklam, Muscatine, Iowa, assignors to The Keever Company, a corporation of Ohio
No Drawing. Continuation-in-part of application Ser. No. 461,062, June 3, 1965. This application June 20, 1968, Ser. No. 738,406
Int. Cl. C08b 19/01
U.S. Cl. 260—233.3
10 Claims

ABSTRACT OF THE DISCLOSURE

A sulfite-carbonyl starch complex is prepared by effecting the interaction of a carbonyl-enriched starch and sulfite ions. The carbonyl starch may be a dialdehyde starch, may be a carbonyl-enriched product of the hypochlorite oxidation of starch, and the like. A preferred embodiment of the invention involves interacting a carbonyl starch and sulfite ions in an aqueous slurry of a carbonyl starch containing about 1% dissolved sodium sulfite (based on starch weight) and at a pH of about 6–10.

This application is a continuation-in-part of our application Ser. No. 461,062 filed June 3, 1965 now abandoned; which latter application is a continuation-in-part of our application Ser. No. 196,424, filed May 21, 1962 now abandoned.

BACKGROUND OF THE INVENTION

This invention deals with a sulfite-carbonyl starch complex and with the preparation thereof by effecting the interaction of a carbonyl starch and sulfite ions.

The term "carbonyl starch," as used herein, refers to a starch which has been oxidized in a manner to yield a significant proportion of carbonyl groups in the molecules thereof. Carbonyl starches are well known in the art and have been made in a number of ways. For example, starches have been oxidized at a relatively low pH with periodic acid to make a dialdehyde starch. Most commonly, starches are oxidized at a relatively low alkaline pH, for example pH 8, with sodium hypochlorite. Methods of preparing carbonyl starches, however, are well known and are not a part of the present invention. Our concern with carbonyl starches is that they comprise the substrate necessary to form the sulfite-carbonyl starch complex of the invention.

Carbonyl starches may include carboxyl groups as well as carbonyl groups. For example, dialdehyde starch can be partially oxidized with chlorous acid to convert the aldehyde groups to carboxyls. Similarly, hypochlorite oxidation results in relatively more carboxyl radical production at relatively high pH levels.

Carbonyl starches have found use in paper-sizing because of their excellent adhesive properties, high fluidity, lower gelatinization temperatures, and lesser tendency to retrograde as compared to the native starches. There is a need, however, to reduce the peak cooking viscosity of carbonyl starches, particularly those resulting from hypohalite oxidation, without sacrifice of the integrity, or degradation, of the carbonyl starch molecules. There is also need to improve the TiO$_2$ retention and color of carbonyl starches.

It is known that holding a slurry of a carbonyl starch at an alkaline pH reduces its peak cooking viscosity, but at the most effective pH levels. For example, in highly alkaline slurries, such reduction is accompanied by alkaline degradation of the carbonyl starch molecule.

OBJECTS

It is therefore an object of the invention to provide modified carbonyl starch derivatives with low peak cooking viscosities, improved color, and improved TiO$_2$ retention.

It is a further object of the invention to provide a sulfite-carbonyl starch complex.

It is a further object to provide a method for the preparation of such a sulfite-carbonyl starch complex.

SUMMARY OF THE INVENTION

We have now found that the foregoing and related objects can be attained by the preparation of a sulfite-carbonyl starch complex and by the method which comprises the step of effecting the interaction of a carbonyl starch and sulfite ions.

We refer to the product as a "sulfite-carbonyl starch complex" because we are not sure of its exact nature. There is evidence which suggests that the sulfite may be chemically bound to the starch molecule for the reasons that (1) it does not wash out and (2) there is an increase in intrinsic viscosity of the product. However, it is possible that these properties might also be achieved with some sort of loose bond between the sulfite and the carbonyl starch. As will be pointed out more fully later, our sulfite modification is quite distinct from the well known bisulfite addition compounds (e.g. see U.S. Pat. No. 2,880,236 issued Mar. 31, 1959 to Mehltretter et al.).

For similar reasons we describe our method as an "interaction." Evidence to date indicates that the sulfite does not combine or "react with" the carbonyl groups in stoichiometric proportions. However, because there is evidence that the sulfite modified molecule may be larger than the substrate carbonyl starch molecule and because the sulfite does not wash out of the product; we are of the opinion that, as measured from any practical standpoint, a sulfite moiety has become a part of a complex with the starch molecule and, as measured from any practical standpoint, the carbonyl starch and sulfite ions have interacted.

We had inferred in earlier filed applications that the effective sulfite moiety was the molecule of sulfite salt used. Thus, we had noted that sodium sulfite, potassium sulfite, ammonium sulfite, and magnesium sulfite were effective but that zinc sulfite, for example, was not. It now appears that this definition of the effective sulfite moiety was incorrect. Although the sulfites of sodium, potassium, ammonium, and magnesium are preferred sources of sulfite ions, it now appears that it is the sulfite ion which is the effective moiety. Thus, it makes no difference what the source of the sulfite ion is, provided that the salt is soluble enough and the pH of the medium is maintained high enough to yield a significant proportion of sulfite ions (as opposed to bisulfite ions) and is maintained low enough to avoid alkaline degradation of the starch. Thus, a pH range of 6–10, or even better, 7–9 is preferred. As the pH drops below about 7 or rises above about 9 advantage of the invention gradually becomes lost. Thus, at a pH of 5 or at a pH of 11 there is little, if any, advantage to the method of the invention.

Interaction between carbonyl starch and sulfite ions is best effected by cooking, at a suitable pH, a slurry of the starch to which has been added a soluble sulfite. As indicated in the examples herein cooking in an amylograph is sufficient to effect the interaction.

Because our sulfite-carbonyl starch complex is generally used in a manufacturing plant (e.g., a paper making plant) other than the one in which carbonyl starches are prepared, and is generally used in a process which involves a cooking step, we find it most practical to dry blend the sulfite salt with the carbonyl starch prior to shipment to the user. In this manner only one cooking step is involved in the entire process of making and using the product of the invention. Although the term "dry blend" is in common use, it is understood that so called "dry" starches contain significant proportions of water. Undoubtedly, some interaction between sulfite ions and carbonyl starch takes place during the period of storage prior to the ultimate slurrying and cooking procedure. For the foregoing reason we consider the dry blending of a soluble sulfite salt with a carbonyl starch as a part of our invention.

In those cases where the complex of the invention is to be prepared and used in the same manufacturing plant it is preferred that the sulfite salt be added at the completion of the reaction in which the unmodified starch is oxidized and without separation of the carbonyl starch from the reaction mixture. Where this is done following a hypochlorite oxidation it is necessary to reduce any residual oxidizing forms of chlorine before one can bring about the interaction of the invention. Such reduction has been done commercially by the addition of an antichlor, usually a sulfite (accompanied by the oxidation of the sulfite). It must be noted that this use of a sulfite salt (that is, the reduction of chlorine, hypochlorite, and the like) forms no part of the present invention. Thus, if one is carrying out a hypochlorite oxidation of starch with the intention of a subsequent sulfite modification of a carbonyl starch he may wish to reduce residual oxidizing forms of chlorine and effect the sulfite modification with a single addition of sulfite salt. This he can do by adding sufficient sulfite to accomplish both objectives. However, our description herein, and quantities specified, refers only to that sulfite added for purposes of effecting the interaction of a carbonyl starch and sulfite ions.

It may be noted also that sodium sulfite has been used together with sodium hydroxide to reduce the acidity of a reaction mixture following the oxidation of starch with chlorine, for example. Thus, Kerr (U.S. No. 2,108,862) raised the pH of such a reaction mixture to about 5.0 with a mixture of sodium hydroxide and sodium sulfite. This use of a sulfite (that is, as a base) is likewise not a part of our invention.

Although about 1% of a soluble sulfite salt is used in the commercial practice of the invention, up to about 15% is a preferred range for the lowering of peak cooking viscosities and up to about 4% for improving $TiO_2$ retention. As illustrated in Example 3, as little as 0.017% sodium sulfite yielded a small but significant lowering of peak cooking viscosity at pH 6 while 13.6% sodium sulfite yielded an extensive lowering at pH 9. However, the use of about 1% of a soluble sulfite salt at pH 8, for example, yields practically all the advantages of the invention. All concentrations of sulfite salt are based on the dry weight of the carbonyl starch.

The actual concentration of sulfite ions in a solution of a sulfite salt will depend on the pH. The ionization constant of bisulfite ion is about $10^-$. Thus:

$$HSO^-_3 = H^+ + SO^=_3$$
$$\frac{[H^+]\cdot[SO^=_3]}{[HSO^-_3]} = 10^{-7}$$
$$\frac{[SO^=_3]}{[HSO^-_3]} = \frac{10^{-7}}{[H^+]}$$

Thus the approximate ratio of sulfite ions to bisulfite ions is given by the following table.

| pH | Ratio |
|---|---|
| 5 | 0.01 |
| 6 | 0.1 |
| 7 | 1 |
| 8 | 10 |
| 9 | 100 |
| 10 | 1000 |

At pH levels below 6 the concentration of sulfite ions becomes vanishingly small and the concentration of bisulfite ions becomes significant. Because the method of the invention does not work effectively below a pH of 6 it is apparent that bisulfite ions play no significant role. Similarly, the failure of salts like zinc sulfite and calcium sulfite to yield the product of the invention is attributed to their low solubility in water and consequently, their failure to yield significant concentrations of sulfite ions.

Although, as discussed above, starch can be oxidized in a number of ways to yield a carbonyl starch, that is, a starch which is relatively enriched in carbonyl groups. The preferred industrial method is via hypochlorite oxidation at a relatively low alkaline pH. Such method of oxidation is illustrated in the following examples.

EXAMPLE 1

A 20.8° Baumé unmodified wheat starch slurry (9870 lbs., dry basis) was placed in a reaction tub. The pH of the slurry was 5.9 and the temperature 78° F. Hypochlorite solution (109 gallons including 49 lbs. dry weight sodium hypochlorite) was added. The pH of the resulting solution was 8.55. The mixture was allowed to react for 3 hours, the pH being permitted to drop during the reaction. The residual oxidized forms of chlorine were then reduced with an antichlor which, in this case, was 10 lbs. of sodium sulfite (this use not being a part of the invention). The pH was then adjusted to about 5–6.5. The resulting carbonyl starch was then filtered out, washed, and dried. The product is typical of those which can be dry blended with a soluble sulfite salt, usually sodium sulfite, as an additive in the manufacture of paper.

EXAMPLE 2

Example 1 was repeated except that sodium sulfite was added at the completion of the oxidation reaction for purposes of reacting sulfite with the carbonyl starch. In a first batch (9870 lbs. starch), and following the reduction of residual oxidizing forms of chlorine with an antichlor, 50 lbs. of sodium sulfite (0.5% of starch weight) were added to the slurry of carbonyl starch. The resulting pH was 6.7. Soda ash (20 lbs. was added to bring the pH to 7.2. Samples cooked in an amylograph showed that the sulfite effected a low degree of modification of the carbonyl starch.

In the second batch (10,112 lbs. starch), and following the elimination of oxidizing forms of chlorine with an antichlor, 125 lbs. of sodium sulfite (1.2% of starch weight) (dissolved in 100 gallons of water) were added. This brought the pH to 6.9. No further pH adjustment was made. Samples cooked in an amylograph showed that the sulfite effected a medium degree of modification of the carbonyl starch.

In a third batch (17,780 lbs. of starch), and following the elimination of oxidizing forms of chlorine, 70 lbs. of sodium sulfite were added to bring the pH of the slurry to 5.8 (this use not being a part of the invention). The carbonyl starch was filtered out, washed and dried. Subsequently, the carbonyl starch was dry blended with 90 lbs. of sodium sulfite (0.5% of starch weight). The dry blend, when subsequently slurried, has a pH of 8.6. Samples cooked in an amylograph showed a high degree of modification of the carbonyl starch.

EXAMPLE 3

As pointed out above, cooking a carbonyl starch at an alkaline pH can cause a lowering of the peak cooking viscosity of a carbonyl starch. To offer a measure of the relative sulfite and pH effect we prepared a series of slurries (12% solids) of a carbonyl starch at various pH levels. The carbonyl starch used was comparable to that prepared in Example 1. To one set of samples we added sulfite and to a second set we did not. The samples were cooked in an amylograph. The following results were observed with a carbonyl starch having initially a peak viscosity of 980 B. U. (Brabender units).

| pH | Percent Na$_2$SO$_3$ | Peak viscosity (B.U.) | Set back |
|---|---|---|---|
| 6 | 0.017 | 880 | 130 |
| 7 | 0.145 | 560 | 60 |
| 8 | 1.45 | 10 | 10 |
| 9 | 13.5 | 10 | 10 |
| 6 | | 940 | 170 |
| 7 | | 760 | 110 |
| 8 | | 400 | 60 |
| 9 | | 70 | 30 |

EXAMPLE 4

We prepared a series of slurries (16% solids) of a carbonyl starch (with and without sulfite additions) which was relatively more oxidized than the starch of Example 3 but had less carbonyl groups. Such a starch is prepared via hypochlorite oxidation at a relative high pH (e.g. about pH=10) which results in a relatively high ratio of carboxyl to carbonyl groups. The following results were observed:

| pH | Percent Na$_2$SO$_3$ | Peak viscosity (B.U.) | Set back |
|---|---|---|---|
| 6 | 0.10 | 240 | 40 |
| 7 | 0.45 | 210 | 40 |
| 8 | 2.30 | 170 | 30 |
| 9 | 13.6 | 100 | 30 |
| 6 | | 240 | 50 |
| 7 | | 220 | 40 |
| 8 | | 200 | 40 |
| 9 | | 180 | 40 |

EXAMPLE 5

As indicated in Examples 3 and 4 there is advantage in combining the sulfite effect and the pH effect, provided the pH is not too high. Thus, three samples of oxidized wheat starch having, respectively, about 6.5, 10, and 14 millimols of carbonyl groups per 100 grams of starch were cooked (with and without sulfite) in any amylograph. The following results were observed, the increased pH of the sulfite containing samples resulting from the presence of the sulfite.

| Carbonyl (millimols) | Percent Na$_2$SO$_3$ | pH | Peak viscosity (B.U.) | Viscosity 95° C. after 50 minutes | Set back |
|---|---|---|---|---|---|
| 6.5 | | 5.9 | 1,680 | 360 | 700 |
| 6.5 | 0.75 | 8.0 | 110 | 0 | 50 |
| 10 | | 6.2 | 1,730 | 150 | 90 |
| 10 | 0.75 | 8.4 | 30 | 0 | 0 |
| 14 | | 6.0 | 1,360 | 10 | 40 |
| 14 | .75 | 8.0 | 40 | 0 | 0 |

EXAMPLE 6

In order to determine whether there is any alteration of the molecular size of the carbonyl starch (by the formation of an addition compound, by the uncoiling of the starch molecules, by the lengthening of the molecules, or the like) intrinsic viscosity determinations were made on various sulfite modified carbonyl starches using the method described by R. F. Steiner in Chemical Foundations of Molecular Biology, published by Dr. Van Nostrand Co., New York City (pp. 99–102). Thus, we prepared two samples of oxidized wheat starch having, respectively, about 9.5 and 12.5 millimols of carbonyl groups per 100 grams of starch. Sodium sulfite was dry blended with the carbonyl starches prior to cooking in an amylograph. The following results were observed:

| Carbonyl (millimols) | pH | Percent Na$_2$SO$_3$ | Intrinsic viscosity (+1) |
|---|---|---|---|
| 9.5 | 8.5 | | 25.5 |
| 9.5 | 8.5 | 1.0 | 36 |
| 12.5 | 8.5 | | 22 |
| 12.5 | 8.5 | 1.0 | 30 |

EXAMPLE 7

This example illustrates the effect of sulfite addition at acid pH levels as compared to alakline pH levels. A sample oxidized wheat starch having about 9.5 millimols of carbonyl groups per 100 grams of starch was divided into 3 portions. One portion served as a control (no sulfite addition); one portion was treated with 1% Na$_2$SO$_3$ and was cooked in an amylograph at pH=8.3; and one portion was treated with 1% Na$_2$SO$_3$ and was cooked in an amylograph at pH=5.0. The following was observed:

| Sample | pH | Peak viscosity (B.U.) |
|---|---|---|
| Control | | 1,500 |
| 1% Na$_2$SO$_3$ | 5.0 | 1,500 |
| 1% Na$_2$SO$_3$ | 8.3 | 25 |

This example also demonstrates that the effect of the sodium sulfite is not a "salt effect." If the effect were that of salt effect the samples at pH 5.0 and pH 8.3 would be expected to have similar peak viscosities. We have, similarly, compared the effect of ammonium sulfite and ammonium sulfate at the same pH level. In an instance where ammonium sulfite lowered the peak cooking viscosity of a carbonyl starch from 920 B.U. to 0 B.U., twice the proportion of ammonium sulfate lowered it to 240 B.U. Similarly bisulfates (or sulfites below about pH 6) have failed to yield the advantages of the invention regardless of salt concentration.

EXAMPLE 8

Determinations were made of the TiO$_2$ retention of a sulfite-dialdehyde cornstarch complex. The tests were made in the usual manner except that a dry blend of dialdehyde starch and sulfite was added to the paper pulp instead of the usual carbonyl starch. The resulting mixture was cooked at pH 6. Results were as follows:

| Percent Na$_2$SO$_3$: | Percent retention |
|---|---|
| 0 | 89 |
| 0.5 | 99 |
| 0.75 | 99 |
| 1.0 | 99 |
| 2.0 | 97 |
| 3.0 | 96 |
| 4.0 | 95 |
| 6.0 | 82 |
| 8.0 | 80 |

EXAMPLE 9

A solution of sodium sulfite and a solution of sodium bisulfite were prepared at a concentration of 5 grams per 100 ml. The pH of each solution was adjusted to 9.0. Each was added to a separate sample of a carbonyl starch containing about 9.5 millimols of carbonyl groups per 100 grams of starch, the salt being present in a proportion of 1% of the carbonyl starch. The TiO$_2$ retention of samples of the unmodified carbonyl starch ran 40–42%. The sulfite modified carbonyl starch, in both cases, ran 50–54%. It is assumed, as indicated above, that the sodium sulfite and sodium bisulfite solutions, when adjusted to a pH of 9.0 are identical; that is, sulfite is the predominant anion.

Although the foregoing examples illustrated various sulfite-carbonyl starches wherein the carbonyl starch was derived from the hypochlorite oxidation of wheat or the periodate oxidation of corn, other starches can be used. For example we have made similar products where the starch was derived from wheat, corn, tapioca, and potato. Similarly, we have made the complex where the unmodified starch had been oxidized by calcium hypochlorite, by sodium hypobromite, by chlorine, by a mixture of sodium hypochlorite and sodium bromide, or by a mixture of sodium hypochlorite and sodium hypobromite.

The product of the invention is very stable, of good color, and has already demonstrated commercial utility in competition with carbonyl starches.

We claim:

1. A dry blend of carbonyl starch and a water-soluble sulfite salt, said salt being present in proportion of up to about 15 percent of the starch weight and in excess of that needed to raise the pH of acidically chlorinated carbonyl starch to about 5.0, said proportion being effective at a pH of 6 to 10 to lower the peak cooking viscosity of said starch.

2. The blend according to claim 1 wherein said salt is present in a proportion of about one percent of the starch weight.

3. The method which comprises the step of effecting the interaction of a carbonyl starch and sulfite ions by treating said carbonyl starch with sulfite ions from a water-soluble sulfite salt, said treatment occurring at a pH within the range of 6 to 10, and said salt being present in a proportion of up to about 15 percent of the starch weight, said proportion being effective to lower the peak cooking viscosity of said starch.

4. The method according to claim 3 wherein the interaction is effected in an aqueous slurry of said starch at a pH within the range of 6 to 10.

5. The method of claim 3 wherein the interaction is effected in an aqueous slurry of said starch at a pH within the range of about 7 to 9.

6. The method according to claim 5 wherein said carbonyl starch is cooked in the presence of said ions at a temperature to avoid degrading said carbonyl starch substantially.

7. The method according to claim 5 wherein a soluble sulfite salt is added to the reaction mixture in which the carbonyl starch reactant was prepared.

8. The method according to claim 5 wherein the salt is present in a proportion of about one percent of the carbonyl starch weight.

9. The sulfite-carbonyl starch complex obtained from the method according to claim 3.

10. The method of claim 5 wherein said sulfite salt is selected from the group consisting of sodium sulfite, potassium sulfite, ammonium sulfite and magnesium sulfite.

References Cited

UNITED STATES PATENTS

| | | | |
|---|---|---|---|
| 2,108,862 | 2/1938 | Kerr | 127—33 |
| 2,749,259 | 6/1956 | Evans et al. | 127—32 |
| 2,880,236 | 3/1959 | Mehltretter et al. | 260—513 |
| 3,086,969 | 4/1963 | Slager | 260—209 |
| 3,098,869 | 7/1963 | Borchert | 260—513 |

HOSEA E. TAYLOR, Primary Examiner

M. I. MARQUIS, Assistant Examiner

U.S. Cl. X.R.

106—210, 213; 117—156; 260—209

UNITED STATES PATENT OFFICE
CERTIFICATE OF CORRECTION

Patent No. 3,557,084　　　　　　　　　Dated　January 19, 1971

Inventor(s)　Roy G. Hyldon, Robert L. High and Fredrick H. Anklam

It is certified that error appears in the above-identified patent and that said Letters Patent are hereby corrected as shown below:

Column 3, line 56, for "about $10^-.$" read ---about $10^{-7}.$---
Column 3, lines 61-62, for　　　　　　　　　read

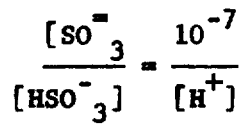　　　　　　　　　　　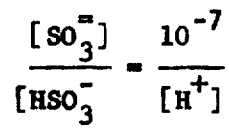

Column 4, line 40, for "(20 lbs. was" read ---(20 lbs.) was---.
Column 5, line 38, for "any" read ---an---. Column 6, line 3, for "alakline" read ---alkaline---. Column 6, line 4, for "sample oxidize read ---sample of oxidized---. Column 6, line 34, for "cornstarch" read ---corn starch---. Column 7, line 24, claim 4, for "of about 6-10 read ---of 6-10---. Column 7, line 27, claim 5, for "of about 7-9" read ---of 7-9---.

Signed and sealed this 8th day of June 1971.

(SEAL)
Attest:

EDWARD M. FLETCHER, JR.　　　　　　　WILLIAM E. SCHUYLER, JR.
Attesting Officer　　　　　　　　　　Commissioner of Patents